United States Patent
Herold et al.

(10) Patent No.: US 9,215,142 B1
(45) Date of Patent: Dec. 15, 2015

(54) COMMUNITY ANALYSIS OF COMPUTING PERFORMANCE

(75) Inventors: Scott Matthew Herold, Elgin, IL (US); Geoffrey Alan James Vona, Toronto (CA); Michael Hugh Condy, Dunoon (GB)

(73) Assignee: Dell Software Inc., Aliso Viejo, CA (US)

( * ) Notice: Subject to any disclaimer, the term of this patent is extended or adjusted under 35 U.S.C. 154(b) by 518 days.

(21) Appl. No.: 13/451,274

(22) Filed: Apr. 19, 2012

Related U.S. Application Data

(60) Provisional application No. 61/477,468, filed on Apr. 20, 2011.

(51) Int. Cl.
  *G06F 15/16* (2006.01)
  *H04L 12/24* (2006.01)

(52) U.S. Cl.
  CPC .......... *H04L 41/084* (2013.01); *H04L 12/2431* (2013.01)

(58) Field of Classification Search
  USPC ........................... 709/223, 226; 718/104, 105
  See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |

(Continued)

OTHER PUBLICATIONS

"Instance Monitor the Real-Time Database Monitoring and Diagnostic Solution for Oracle," Brochure, Quest Software, Inc. 1999, 2 pages.

(Continued)

*Primary Examiner* — Shirley Zhang
(74) *Attorney, Agent, or Firm* — Winstead PC

(57) ABSTRACT

Embodiments of systems and methods are described for performing community analysis of computing performance. These systems and methods can collect and analyze community performance data from a plurality of physical or virtual infrastructure installations. The systems and methods can leverage this community performance data to identify and recommend areas where individual physical or virtual infrastructures can improve performance.

9 Claims, 11 Drawing Sheets

(56) References Cited

U.S. PATENT DOCUMENTS

| | | | |
|---|---|---|---|
| 5,740,357 A | 4/1998 | Gardiner et al. | |
| 5,748,881 A | 5/1998 | Lewis et al. | |
| 5,752,062 A | 5/1998 | Gover et al. | |
| 5,768,501 A | 6/1998 | Lewis | |
| 5,872,909 A | 2/1999 | Wilner et al. | |
| 5,881,306 A | 3/1999 | Levine et al. | |
| 5,903,453 A | 5/1999 | Stoddard, II | |
| 5,903,898 A | 5/1999 | Cohen et al. | |
| 5,911,048 A | 6/1999 | Graf | |
| 5,960,425 A | 9/1999 | Buneman et al. | |
| 5,978,594 A | 11/1999 | Bonnell et al. | |
| 5,983,366 A | 11/1999 | King | |
| 6,018,567 A | 1/2000 | Dulman | |
| 6,029,170 A | 2/2000 | Garger et al. | |
| 6,035,412 A | 3/2000 | Tamer et al. | |
| 6,128,016 A | 10/2000 | Coelho et al. | |
| 6,148,335 A | 11/2000 | Haggard et al. | |
| 6,199,199 B1 | 3/2001 | Johnston et al. | |
| 6,243,105 B1 | 6/2001 | Hoyer et al. | |
| 6,330,008 B1 | 12/2001 | Razdow et al. | |
| 6,351,754 B1 | 2/2002 | Bridge et al. | |
| 6,473,791 B1 | 10/2002 | Al-Ghosein et al. | |
| 6,538,669 B1 | 3/2003 | Lagueux, Jr. et al. | |
| 6,594,655 B2 | 7/2003 | Tal et al. | |
| 6,622,221 B1 | 9/2003 | Zahavi | |
| RE38,270 E | 10/2003 | Nakajima | |
| 6,654,830 B1 | 11/2003 | Taylor et al. | |
| 6,771,646 B1 | 8/2004 | Sarkissian et al. | |
| 6,901,582 B1 | 5/2005 | Harrison | |
| 6,993,454 B1 | 1/2006 | Murstein et al. | |
| 7,103,843 B2 | 9/2006 | Hand et al. | |
| 7,127,324 B2 | 10/2006 | Batori et al. | |
| 7,274,375 B1 | 9/2007 | David | |
| 7,363,211 B1 | 4/2008 | Naganathan et al. | |
| 7,480,647 B1 | 1/2009 | Murstein et al. | |
| 7,480,866 B2 | 1/2009 | Germain et al. | |
| 7,512,888 B2 | 3/2009 | Sugino et al. | |
| 7,532,642 B1 | 5/2009 | Peacock | |
| 7,587,492 B2 | 9/2009 | Dyck et al. | |
| 7,620,984 B2 | 11/2009 | Kallahalla et al. | |
| 7,685,251 B2 | 3/2010 | Houlihan et al. | |
| 7,784,027 B2 | 8/2010 | Harrison | |
| 7,792,941 B2 | 9/2010 | Fried et al. | |
| 7,882,216 B2 | 2/2011 | Houlihan et al. | |
| 7,917,617 B1 | 3/2011 | Ponnapur et al. | |
| 7,979,245 B1 | 7/2011 | Bourlatchkov et al. | |
| 8,051,162 B2 | 11/2011 | Arlitt et al. | |
| 8,051,382 B1 | 11/2011 | Kingdom et al. | |
| 8,103,638 B2 | 1/2012 | Voznika et al. | |
| 8,103,826 B2 | 1/2012 | Kobayashi | |
| 8,112,366 B2 | 2/2012 | Hollingsworth et al. | |
| 8,155,996 B1 | 4/2012 | Cassone et al. | |
| 8,175,863 B1 | 5/2012 | Ostermeyer et al. | |
| 8,181,154 B2 | 5/2012 | Harrison | |
| 8,185,598 B1 | 5/2012 | Golovin et al. | |
| 8,217,945 B1 | 7/2012 | Moscovici | |
| 8,239,526 B2 | 8/2012 | Simpson et al. | |
| 8,255,516 B1 | 8/2012 | Zhang et al. | |
| 8,826,290 B2 * | 9/2014 | Watanabe et al. | 718/104 |
| 2002/0175941 A1 | 11/2002 | Hand et al. | |
| 2003/0009551 A1 | 1/2003 | Benfield et al. | |
| 2003/0028630 A1 | 2/2003 | Bischof et al. | |
| 2003/0126256 A1 | 7/2003 | Cruickshank et al. | |
| 2003/0149753 A1 | 8/2003 | Lamb | |
| 2003/0225563 A1 | 12/2003 | Gonos | |
| 2004/0012637 A1 | 1/2004 | Alford, Jr. et al. | |
| 2004/0030592 A1 | 2/2004 | Buck et al. | |
| 2004/0059812 A1 | 3/2004 | Assa | |
| 2004/0102925 A1 | 5/2004 | Giffords | |
| 2005/0021743 A1 | 1/2005 | Fleig et al. | |
| 2005/0111352 A1 | 5/2005 | Ho et al. | |
| 2006/0173875 A1 | 8/2006 | Stefaniak | |
| 2007/0028239 A1 | 2/2007 | Dyck et al. | |
| 2007/0043860 A1 * | 2/2007 | Pabari | 709/224 |
| 2007/0226341 A1 | 9/2007 | Mateo | |
| 2007/0255814 A1 | 11/2007 | Green et al. | |
| 2008/0077366 A1 | 3/2008 | Neuse et al. | |
| 2008/0155537 A1 | 6/2008 | Dinda et al. | |
| 2008/0222633 A1 | 9/2008 | Kami | |
| 2008/0320269 A1 | 12/2008 | Houlihan et al. | |
| 2009/0055823 A1 * | 2/2009 | Zink et al. | 718/100 |
| 2009/0055834 A1 * | 2/2009 | Ding et al. | 718/104 |
| 2009/0150538 A1 | 6/2009 | Tripathi et al. | |
| 2009/0172666 A1 | 7/2009 | Yahalom et al. | |
| 2009/0199177 A1 | 8/2009 | Edwards et al. | |
| 2009/0222558 A1 | 9/2009 | Xu et al. | |
| 2009/0241108 A1 | 9/2009 | Edwards et al. | |
| 2009/0300605 A1 | 12/2009 | Edwards et al. | |
| 2010/0070319 A1 * | 3/2010 | Prafullchandra et al. | 705/7 |
| 2010/0114554 A1 | 5/2010 | Misra | |
| 2010/0125665 A1 | 5/2010 | Simpson et al. | |
| 2010/0229096 A1 | 9/2010 | Maiocco et al. | |
| 2010/0325273 A1 | 12/2010 | Kudo | |
| 2011/0047496 A1 | 2/2011 | Harrison | |
| 2011/0119748 A1 | 5/2011 | Edwards et al. | |
| 2011/0161851 A1 | 6/2011 | Barber et al. | |
| 2011/0209146 A1 | 8/2011 | Box et al. | |
| 2011/0254704 A1 | 10/2011 | Fournier et al. | |
| 2011/0302577 A1 | 12/2011 | Reuther et al. | |
| 2012/0030346 A1 | 2/2012 | Fukuda et al. | |
| 2012/0131161 A1 * | 5/2012 | Ferris et al. | 709/223 |
| 2012/0167083 A1 * | 6/2012 | Suit | 718/1 |
| 2014/0019624 A1 * | 1/2014 | Kusuta et al. | 709/226 |

OTHER PUBLICATIONS

Boucher et al., Essential Guide to Object Monitors, Mar. 1999, whole book.

Dewan, et al. "A High-Level and Flexible Framework for Implementing Multiuser User Interfaces", 1992, ACM, p. 345-380.

Distributed Management Task Force, Inc., "Common Information Model (CIM) Infrastructure Specification"; Version 2.3 Final; Oct. 4, 2005; 102 pages.

Harrison, "Building a High-Performance Oracle Database Server," and "Tuning the Database Server," in: "Oracle SQL High-Performance Tuning," (New Jersey. Prentice-Hall, 1997), pp. 363-364, 399-400.

Hitachi TP Broker User's Guide, Release 3.1, 1998, entire manual.

Laessig; "Score Big with JSR 77, the J2EE Management Specification", Javaworld; Jun. 14, 2002; 8 pages.

Muller, Focus on HP OpenView: A Guide to Hewlett Packard's Network Management Platform, 1995, entire book.

Savant Corporation, "Products," http://www.savant-corp.com/prods.html, 1 page downloaded from the World Wide Web on Nov. 16, 1999.

Savant Corporation, "Products," http://www.savant-corp.com/prods.html, 1 page, downloaded and printed from the World Wide Web on Feb. 15, 2000.

Savant Corporation, "Q Application Diagnostics," http:///savant-corp.com/qappd.html, 1 page, downloaded and printed from the World Wide Web on Nov. 16, 1999.

Savant Corporation, "Q Hot SQL," http:///www.savant-corp.com/qhsql.html, 1 page, downloaded and printed from the World Wide Web on Nov. 16, 1999.

Savant Corporation, "Q Instance Overview," http:///www.savant-corp.com/qiov.html, 1 page, downloaded and printed from the World Wide Web on Nov. 16, 1999.

Savant Corporation, "Q Job Queue Manager," http:///www.savant-corp.com/qjobq.html, 1 page, downloaded and printed from the World Wide Web on Nov. 16, 1999.

Savant Corporation, "Q Lock Manager," http:///www.savant-corp.com/qlock.html, 1 page, downloaded and printed from the World Wide Web on Nov. 16, 1999.

Savant Corporation, "Q Replay Viewer," http:///www.savant-corp.com/qreplay.html, 1 page, downloaded and printed from the World Wide Web on Nov. 16, 1999.

(56) References Cited

OTHER PUBLICATIONS

Singh et al; "Designing Web Services with the J2EE™ 1.4 Platform," Chapter 6 (pp. 247-289), May 2004; 46 total pages.

Tang, et al. "Blending Structured Graphics and Layout", 1994, ACM, p. 167-174.

What is a System Center Advisor?, http://onlinehelp.microsoft.com/en-us/advisor/ff962512(printer).aspx, accessed on Apr. 5, 2011.

Microsoft System Center Advisor page, https://www.systemcenteradvisor.com/, accessed on Apr. 4, 2011.

Quest Software, Inc., Foglight APM: An adaptive Architecture for all Environments, Technical Brief, 25 pages, 2011.

\* cited by examiner

COMMUNITY ANALYSIS OF COMPUTING PERFORMANCE

RELATED APPLICATION

This application claims the benefit of priority under 35 U.S.C. §119(e) of U.S. Provisional Application No. 61/477,468, filed on Apr. 20, 2011, and entitled "Community Analysis of Computing Performance," the disclosure of which is hereby incorporated by reference in its entirety.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports and the like) such that specialized services that each of the previous physical machines performed can be run in their native operating system. In particular, a virtualization layer, or hypervisor, allocates the computing resources of one or more host servers to one or more virtual machines and further provides for isolation between such virtual machines. In such a manner, the virtual machine can be a representation of a physical machine by software.

Understanding the performance of a virtual infrastructure is a complex challenge. Performance issues with virtual machines can be based on a variety of factors, including what is occurring within the virtual machine itself, problems with the underlying platform, problems caused by consumption of resource(s) by other virtual servers running on the same underlying platform, and/or problems of priority and allocation of resource(s) to the virtual machine(s).

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain embodiments, a method of providing community analytics related to a plurality of tenant systems includes collecting data from a plurality of tenant systems. At least some of the tenant systems may be operated by different entities. Further, the plurality of tenant systems can constitute a community of tenant systems associated for the purpose of sharing comparative analytics about the tenant systems. The method can also include computing analytics from the data collected from the tenant systems. The analytics can include statistics that reflect shared aspects of the tenant systems. In addition, the method can include receiving a request for analytics from a user of a first one of the tenant systems. Moreover, the method can include, in response to receiving the request, outputting for presentation to the user both a portion of the collected data regarding the first tenant system together with at least a portion of the computed analytics for comparison, thereby enabling the user to compare aspects of the first tenant system with the analytics associated with the community. At least the computing of the analytics can be implemented by a computer system having computer hardware.

A system for providing community analytics related to a plurality of tenant systems can include a data collection module that can collect data from a plurality of tenant systems and a community analytics module implemented by one or more processors. The community analytics module can compute analytics from the data collected from the tenant systems with one or more processors. The analytics can include statistics that reflect shared aspects of the tenant systems. Further, the system can include a user interface module that can output for presentation to the user both a portion of the collected data regarding the first tenant system together with at least a portion of the computed analytics for comparison, thereby enabling the user to compare aspects of the first tenant system with the analytics associated with the community.

In some embodiments, non-transitory physical computer storage is provide that includes instructions stored thereon that, when executed in one or more processors, implement operations for providing community analytics related to a plurality of tenant systems. These operations can include collecting data from a plurality of tenant systems, where the tenant systems can be operated by different entities. The plurality of tenant systems can constitute or be part of a community of tenant systems associated for the purpose of sharing comparative analytics about the tenant systems. The operations can also include computing analytics from the data collected from the tenant systems with one or more processors. The analytics can include metrics that reflect shared aspects of the tenant systems. Further, the operations can include outputting for presentation to a user of a first one of the tenant systems both a portion of the collected data regarding the first tenant system together with at least a portion of the computed analytics for comparison, thereby enabling the user to compare aspects of the first tenant system with the analytics associated with the community.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIG. 5 through 10 illustrate example community analytics user interfaces.

DETAILED DESCRIPTION

I. Introduction

When seeking to improve performance and increase or maximize system uptime, system administrators often struggle to understand and monitor virtual computing infrastructures. As a result, it can be difficult to quickly diagnose and resolve problems with virtual infrastructures. Virtual infrastructures also present challenges for capacity planning and analysis and in attempting to better understand utilization and costs associated with virtual infrastructures. Many of these challenges also exist with physical computing infrastructures, including both physical computing infrastructures that host virtual machines and physical infrastructures that do not host virtual machines.

This disclosure describes embodiments of systems and methods for performing community analysis of computing performance. These systems and methods can collect and analyze community performance data from a plurality of physical or virtual infrastructure installations. The systems and methods can leverage this community performance data to identify and recommend areas where individual physical or virtual infrastructures can improve performance.

II. System Overview

Figure 1:
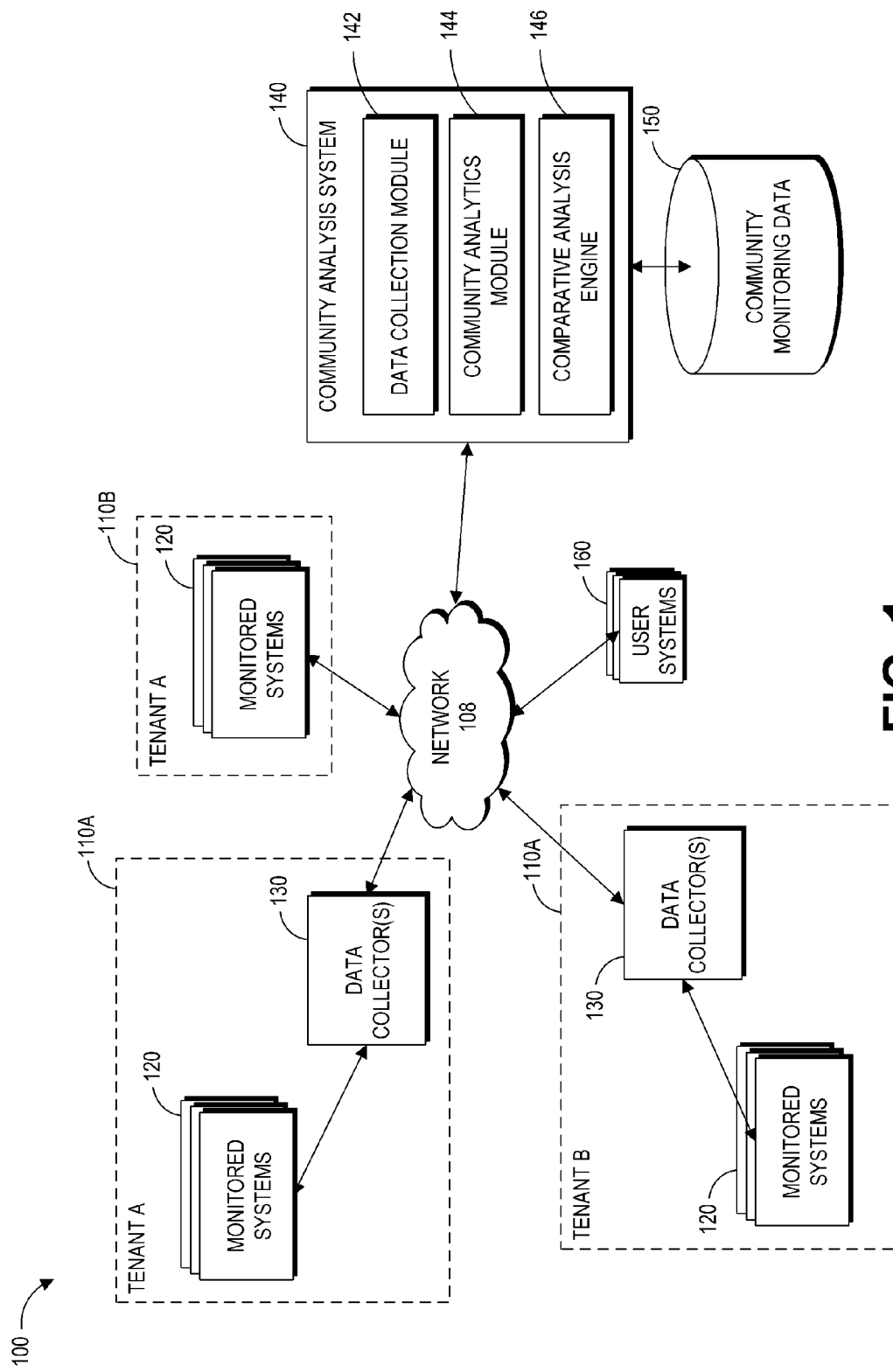
FIG. 1 illustrates an example computing environment including an embodiment of a community analysis system.

FIG. 1 illustrates an example computing environment 100 for implementing a community analysis system 140. In the computing environment 100, tenant systems 110 connect to the community analysis system 140 over a network 108, which may be a private network, a public network, a local or wide area network, the Internet, combinations of the same, or the like. Each of the tenant systems 110 can represent an installation of physical and/or virtual computing infrastructure. In general, the tenant systems 110 can provide various types of data to the community analysis system 140, including, for example, performance data and system configuration data. The community analysis system 140 can advantageously mine or analyze this data to identify analytics or metrics about the data, make configuration recommendations to enable performance adjustments, and so forth.

The tenant systems 110 shown can be owned or operated by the same or different entities. For example, two of the tenant systems 110 installed in separate locations are shown as owned or operated by "Tenant A," while another system 110 is owned or operated by a different tenant, "Tenant B." Tenants A and B can represent customers (e.g., entities such as companies or individuals) of an operator of the community analysis system 140. Collectively, tenant systems 110 monitored by the community analysis system 140 can be part of a community for monitoring purposes. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more monitored systems 120. The monitored systems 110 can include physical and/or virtual computing devices, such as physical machines and/or virtual machines. For instance, a monitored system 110 may include any of the following: a virtual machine, server, web server, application server, database, application, processor, memory, hard drive or other storage device, peripheral, software component, database tables, tablespaces in a database, application tiers, network switches or other network hardware, combinations of the same or the like. Any given tenant system 110 can include from one to several monitored systems 110. For example, a tenant system 110 can represent an entire data center having hundreds or even thousands of monitored systems 110.

Data collectors 130 can be provided in some or all of the tenant systems 110. In the depicted embodiment, data collectors 130 are shown in a pair of the tenant systems 110A, while no data collector 130 is provided in one of the tenant systems 110B. The data collectors 130 can be software and/or hardware agents, appliances, or the like that collect monitoring data about the monitored systems 120. This monitoring data can include performance data related to the performance of physical and/or software components (including virtual components), such as performance related to any of the monitored systems 110 described above. The monitoring data can also include information about attributes, characteristics, or properties of the monitored systems 110, such as the number of processors in each host device, memory or storage capacity, hardware or software specifications, virtual machine characteristics, and so forth. The data collectors 130 can collect this monitoring data periodically, e.g., according to a schedule, on-demand, or a combination of the same. In some tenant system 110 installations having many monitored systems 110, one or more management servers (not shown) can manage data collection of a plurality of data collectors 130.

The data collectors 130 provide the collected monitoring data to the community analysis system 140. Other tenant systems 110 that do not have local data collectors 130, such as the tenant system 110B, can provide monitoring data directly to the community analysis system 140. The community analysis system 140 can access this data remotely by querying libraries or APIs of the monitored systems 110B, thereby replacing the functionality of the data collectors 130 in some embodiments. More generally, in other embodiments, local data collectors 130 or other agents may be omitted, or each tenant system 110 can include one or more data collectors 130.

Thus, monitoring data can be fed from the tenant sites 110 into a centralised community repository 150 maintained by the community analysis system 140 for analytic processing. The community analysis system 140 can make this community monitoring data and associated analytics available to the tenant systems 110 as result sets. For smaller communities of tenant systems 110, the community analysis system 140 can be implemented as a single management server. Alternatively, the community analysis system 140 can be implemented in a plurality of virtual or physical servers, which may or may not be geographically co-located. For example, the community analysis system 140 and/or other aspects of the computing environment 100 may be hosted in a cloud-based hosting service such as the Azure™ service provided by Microsoft® or the EC2™ platform provided by Amazon®.

Example implementations for collecting data using agents and management servers is described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent") and U.S. application Ser. No. 12/370,399 ("the '399 application"). The community analysis system 140 and data collectors 130 can implement some or all of the features described in the '245 patent and the '399 application. In addition, in one embodiment, the community analysis system 140 can implement the features described herein together with at least some of the features of the Foglight™ and/or vFoglight™ software available from Quest Software of Aliso Viejo, Calif.

In the depicted embodiment, the community analysis system 140 includes a data collection module 142, a community analytics module 144, and a comparative analysis engine 146. Each of these components can be implemented with hardware and/or software, including (optionally) virtual machines. The data collection module 142 can obtain and store monitoring data collected by the data collectors 130 or obtain monitoring data directly from the monitored systems 120 (e.g., using web service calls or other remote procedure calls).

The community analytics module 144 can compute and store community analytics or metrics related to the community monitoring data. These statistics can be generated for any measurable data available in the community monitoring data. Some examples of such measurable data can include data regarding the number of virtual machines that run on a given host, workload on a give host, network bandwidth, storage consumption, processor utilization, hardware or software configuration settings, and the like. For example, the community analysis module 144 can determine the average number of virtual machines that run on a given host in the community.

The comparative analysis engine 146 can analyze the community monitoring data to obtain comparative information regarding which monitored systems 120 are the best performing for various metrics and how these systems differ from community norms or statistics. As one illustration, the comparative analysis engine 146 can rank tenants based on their memory utilization on virtual machine hosts. The comparative analysis engine 146 publishes these rankings in one embodiment, for example, to a web page. The comparative analysis engine 146 can also publish information regarding top movers (e.g., those tenants whose monitored systems 120 are improving the most in certain metrics). The community analysis system 140 can provide an opt-in (or opt-out) mechanism to allow tenants to choose whether to participate in rankings and published data regarding tenant performance.

The web page or other user interface(s) output by the community analysis system 140 can be accessed by users of user systems 160. The user systems 160 can include any type of computing device, such as desktops, laptops, tablets, smartphones, and PDAs, to name a few. The user systems 160 can be operated by users associated with the tenants or by other users.

Moreover, in certain embodiments, the comparative information obtained by the comparative analysis engine 146 can be leveraged to make performance recommendations to tenants. Tenants whose systems are performing poorer than community norms in a given metric can request or be automatically given such recommendations. The comparative analysis engine 146 can provide a user interface, for instance, that allows tenants to obtain customized performance recommendations for related to any analytic or metric available in the community data.

Figure 2:
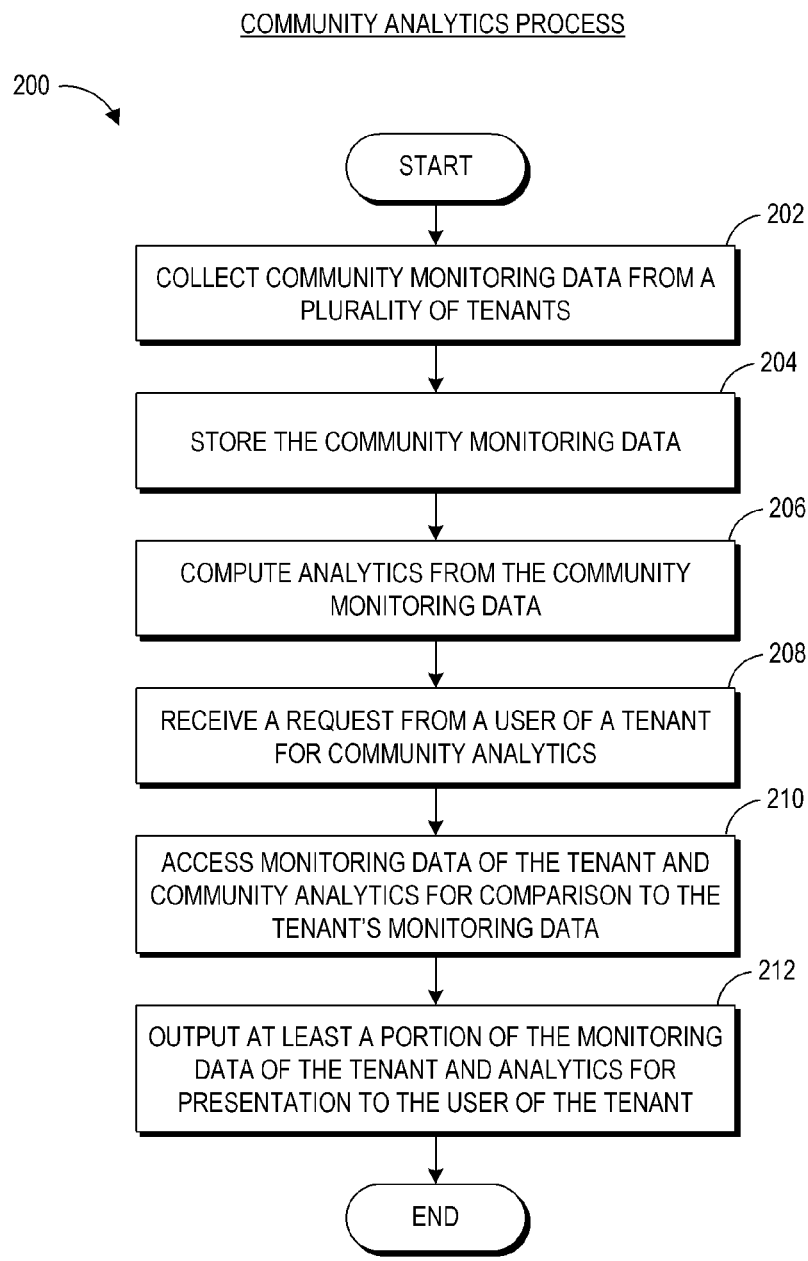
FIG. 2 illustrates an embodiment of a community analytics process that can be implemented by the community analysis system.

FIG. 2 illustrates an embodiment of a community analytics process 200 that can be implemented by the community analysis system 140. The process 200 will be described with respect to components of the community analysis system 140, although other systems could implement these features than those described herein. In certain embodiments, the process 200 enables tenants to compare their monitoring data with community monitoring data to gain insight into ways to improve performance.

The process begins at block 202, where the data collection module 142 of the community analysis system 140 collects community monitoring data from a plurality of tenants. As described above, the data collection module 142 can obtain this data by accessing the data directly from monitored systems 110, by obtaining the data from data collectors 130, or by obtaining the data from management servers. The data collection module 142 can poll the data collectors 130 for data. In another embodiment, the data collectors 130 can push the data to the data collection module 142. Other data collection examples are described below with respect to FIG. 4.

The data collection module 142 stores the community monitoring data in a data repository, such as the repository 150, at block 204. The data collection module 142 can store the community monitoring data in a database or other data store. In one embodiment, the data collection module 142 stores the data in one or more models, such as the topology models described in the '245 patent and/or the '399 application, incorporated above (see also FIG. 4).

At block 206, the community analytics module 144 computes analytics from the community monitoring data. As described above, the community analytics module 144 can compute analytics based on any measurable data in the community monitoring data. For instance, the community analytics module 144 can compute statistics based on the community monitoring data, such as minima, maxima, means, medians, modes, standard deviations, variances, percentages, percentiles, moments, weighted averages, combinations of the same, or the like. As one illustration, the community analytics module 144 can compute the average number of virtual machines that each tenant runs. Another example statistic that can be calculated is the average maximum amount of memory consumed by monitored systems 110 over a period of time. Additional examples are given below, and many other example analytics will be apparent from this disclosure.

The community analytics module 144 can store these analytics for later access by users or can optionally compute the analytics directly in response to a request from a user of a tenant (or another user) for analytics. Analytics may be presented to users without receiving a request for analytics from the users. However, in the depicted embodiment, such a request can be received by the community analytics module 144. In response to receiving the request, at block 210 the community analytics module 144 can access the monitoring data (or a portion thereof) of the tenant corresponding to the requesting user. Further, the community analytics module 144 can access the requested community analytics for comparison to the monitoring data of the tenant. At block 212, the community analytics module 144 outputs at least a portion of the tenant monitoring data and community analytics for presentation to the user of the tenant.

In one embodiment, blocks 210 and 212 are implemented by the community analytics module 144 outputting a web page or other user interface that provides functionality for a user to request analytics. For example, the user interface can include user interface controls such as buttons, menus, or the like that enable the request to be made. In response to receiving the request through the web page or other user interface, the community analytics module 144 can output the requested analytics and monitoring data for comparison on the same web page/user interface or on another web page or user interface. Browser software or other client software on the user systems 160 or monitored systems 120 can access the user interfaces output by the community analytics module 144. Example user interfaces for requesting and displaying community analytics are described below with respect to FIGS. 5 through 11.

In other embodiments, analytics can be requested programmatically by the user systems 160 or by the monitored systems 120. The community analysis system 140 may expose a web service API or other API that enables the user systems 160 or monitored systems 120 to make function calls to obtain community analytics. The tenants can be provided with user interfaces that run locally on the user systems 160 or monitored systems 120 to display the analytics. The user systems 160 or monitored systems 120 can also (or instead) store the analytics for further processing.

Figure 3:
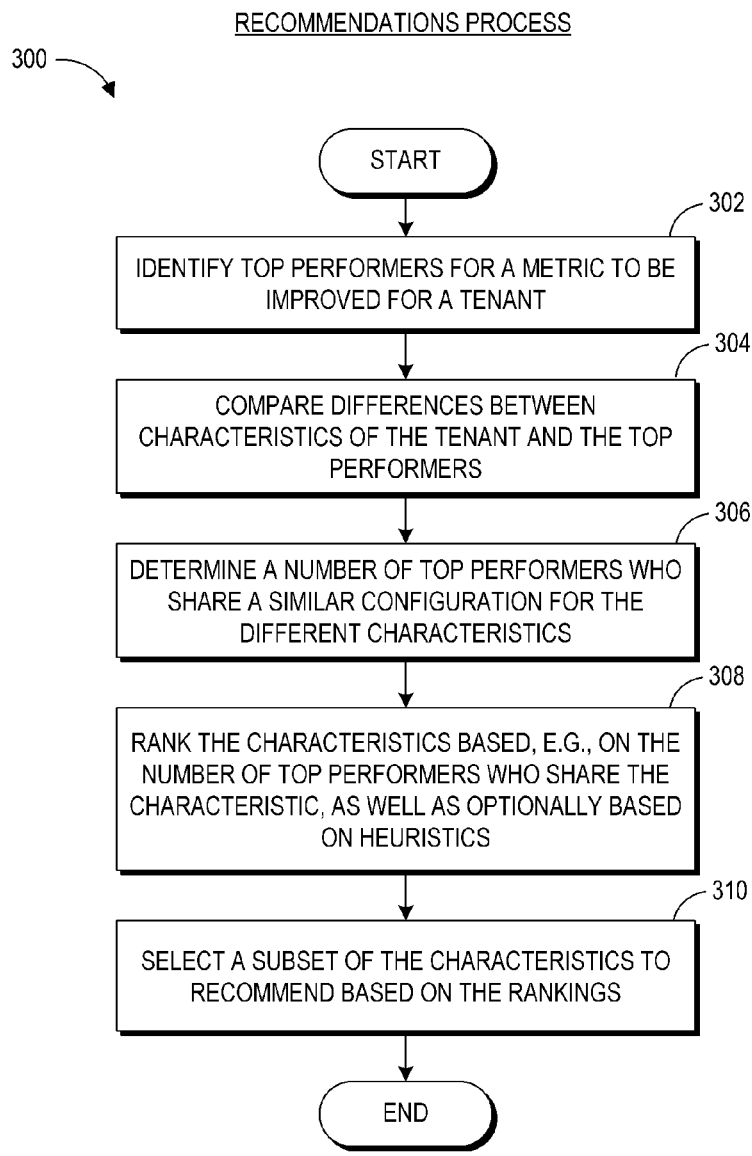
FIG. 3 illustrates an embodiment of a recommendations process that can be implemented by the community analysis system.

FIG. 3 illustrates an example recommendations process 300 for identifying areas of improvement to recommend to a tenant. The process 300 can be implemented by any of the systems described herein, such as the community analysis system 140. For example, the process 300 can be implemented by the comparative analysis engine 146 of the community analysis system 140. In certain embodiments, the process 300 can be implemented in response to a tenant request to improve a certain metric. Alternatively, the process 300 can be performed in response to automatically identifying a metric for which the tenant's system can be improved.

The process begins at block 302, where the comparative analysis engine 146 can access community monitoring data regarding which tenants are top or high performers in the selected metric. At block 304, the comparative analysis engine 146 can then compare differences between characteristics of the target tenant's system and top performers' systems. One or more of these differences may be what are causing a performance gap between the target tenant's system and the top performers' systems.

Top performer systems can include tenant/monitored systems that have a better performance characteristic relative to a target tenant/monitored system for which recommendations will be provided. Top performer systems can include the best performing systems, or simply better performing systems than the target tenant system and not necessarily just the best performing systems. For example, top performer systems can include systems that have greater than average performance in a given characteristic. The greater than average performance can be a statistically significant greater than average performance, such as equal to or more than one standard deviation greater than the mean, equal to or more than two standard deviations from the mean, or equal to or more than three standard deviations from the mean, or the like. The comparative analysis engine 146 can calculate these and other statistics described herein to evaluate the systems to identify top performers.

In another embodiment, the comparative analysis engine 146 considers systems as top performers if they are equal to or more than one or more standard deviations from the performance of the target tenant system 110. As an example, if the mean of virtual machines per host is 20, the standard deviation is 5, and the target tenant system 110 has an average of 12 virtual machines per host, the comparative analysis engine 146 can consider any system having 12+5=17 virtual machines per host or more as being a top performer. Thus, the comparative analysis engine 146 can consider systems equal to or more than one standard deviation from the target tenant system's 110 metric value as being a statistically significant better performer than the tenant system 110 in the metric.

It should be noted that in various embodiments, the comparative analysis engine 146 can use other statistical techniques to determine which systems are better performers than the target tenant system 110, including techniques based on variance instead of the standard deviation, signal-to-noise ratio, percentiles, or the like. For instance, the comparative analysis engine 146 could identify the top 99% percentile of performers in the metric in question, the top 95% percentile of performers, or some other top tier as the top performing systems. Similarly, the comparative analysis engine 146 could identify the number of performers and select the top 10%, the top 20%, or some other percentage as the top tier performers. In yet another embodiment, the comparative analysis engine 146 can discard outliers, including the best performer and/or the worst performer. In yet another embodiment, the comparative analysis engine 146 enables a user of the target tenant system 110 to select the top performer systems with which the target tenant system 110 will be compared.

As described above, the comparative analysis engine 146 identifies differences between the target tenant system 110 and the top performer systems at block 304. Continuing, at block 306, the comparative analysis engine 146 determines, for some or all of these differences, how many of the top performers share a similar configuration for an identified characteristic. For instance, if the target tenant system 110 has below-average memory utilization, and the comparative analysis engine 146 has determined that the tenant system 110 allocates 2 GB of memory per virtual machine, the comparative analysis engine 146 can identify the virtual machine memory allocations of the top performer systems (e.g., in memory utilization) that differ from this memory allocation. The comparative analysis engine 146 can then determine how many of the top performers' systems share the same or similar memory configuration. For example, the comparative analysis engine 146 might identify that a majority of the top performer systems each have allocated 4 GB or more memory per VM instead of 2 GB. The more top performers' systems that have the same or similar characteristic (which differs from the target tenant systems' 110 characteristic), the more likely it is that such characteristic is responsible for the difference in performance.

In one embodiment, the comparative analysis engine 146 determines the percentage of the top performers that share a characteristic different from the target tenant system 110 instead of determining the number of systems that share a characteristic. At block 308, the characteristic or characteristics that were identified at block 304 as being different from the tenant's system are ranked by the comparative analysis engine 146 according to the number of top performer systems that share the characteristic in common. Alternatively, the ranking can be performed based on the percentage of top performer systems that share the characteristic in common. In another embodiment, the comparative analysis engine 146 filters out or does not recommend characteristics based on the number or percentage of top performer systems that share the characteristics. For example, the comparative analysis engine 146 could filter out characteristics that fewer than 30% of top performer systems share, or fewer than 50%, or 90%, or 95%, or any other percentage or number. Filtering out characteristics can have the effect that such characteristics are not recommended to users of the target tenant system 110. Instead of filtering out these characteristics, however, the comparative analysis engine 146 could instead downweight these characteristics or configuration changes such that they are ranked lower than other recommended configuration changes.

Moreover, the comparative analysis engine 146 can filter out or downweight characteristics that lower performing systems share with the top performers. Lower performing systems can be systems that the comparative analysis engine 146 identifies as having lower performance than the target tenant system 110. The comparative analysis engine 146 can, for instance, identify tenant systems as lower performing systems that are less than one or more standard deviations from the mean in a metric of interest, or less than a certain percentage of the total number of tenant systems evaluated with respect to the metric. Using the example above, if the mean of virtual machines per host is 20, the standard deviation is 5, and the target tenant system 110 has an average of 12 virtual machines per host, the comparative analysis engine 146 can consider any system having 12−5=7 or fewer virtual machines per host as being a lower performing system.

Thus, if the comparative analysis engine 146 identifies the top performer systems to share a particular characteristic, and the lower performing systems also have this characteristic, then the comparative analysis engine 146 can avoid recommending this characteristic to the target tenant system 110 or otherwise downweight the characteristic. In another embodiment, the comparative analysis engine 146 still recommends this characteristic to the target tenant system 110 but explains (e.g., via text output on a user interface) that some of the lower performing systems also share that characteristic.

Other heuristics can also be used to rank the likelihood of the characteristics as potential candidates for performance tuning instead of or in addition to the criteria described above. For instance, a top performer characteristic that is in the same category or type as the metric for which the tenant is having lower performance can be ranked higher than other characteristics. As an illustration, if the tenant's network bandwidth is lower than community norms, an identified top performer characteristic related to network configuration may be ranked higher than a top performer characteristic related to memory configuration.

A subset of the characteristics are selected by the comparative analysis engine 146 for recommending to the tenant based on the rankings at block 310. The subset can include a most highly-ranked subset, which may include some or all of the identified characteristics. The process 300 can therefore help tenants identify areas for performance improvement in the target tenant system 110.

The following example illustrates potential benefits of the process 300. In this example, a tenant may have a virtual machine installation running the Java Virtual Machine (JVM). The JVM uses garbage collection as a form of memory management, and this garbage collection feature works efficiently when contiguous memory is preallocated for the JVM. However, some tenants may not allocate the memory continuously in their monitored systems 110, but rather simply specify the total memory to be used by the JVM. As a result, the garbage collection may run slowly. The process 300 can identify other tenant's system models that have better garbage collection performance and can identify that such systems preallocate continguous memory for their JVMs. The process 300 can then recommend that the tenant preallocate continguous memory for the tenant's JVM, thereby enabling the tenant to speed up the process of garbage collection.

It should be noted that in alternative embodiments, a comparison can also be made between poor performing systems and the tenant's system in addition to or instead of comparisons between top performing systems and the tenant's system. For instance, recommendations to change a characteristic can be made if multiple poor performing systems share the same (potentially faulty) characteristic. In yet another embodiment, a comparison can be made between average performing systems and the tenant's system, enabling a user of the tenant to determine a degree to which the tenant outperforms the average performers.

In addition to recommending characteristics or configuration changes to tenants based on the performance of the community, other criteria can be used to make recommendations. Accepted tuning practices, for instance, can be recommended to tenants who are identified as not complying with the accepted tuning practices. The community analysis system 140 can analyze one or more characteristics of a tenant to determine whether the tenant system 110 complies with the accepted tuning practices or other best practices. If the tenant system 110 (e.g., any of the monitored systems 120) do not comply, the community analysis system 140 can recommend changes to the tenant system 110 to comply with the accepted or best practices. In VMware™ virtual computing environments, for example, one commonly-accepted best practice is to deploy the latest version of VMware™ Tools. If the community analysis system 140 detects that the latest version of these tools are not installed on a tenant system 110 (based on the data collected by the data collection module 142), the community analysis system 140 can recommend that the tenant system 110 install such tools. In another example, it is commonly-accepted practice to defragment an index periodically in database environments. The community analysis system 140 can detect whether such an index has been defragmented (based on the data collected by the data collection module 142), and if not, recommend that the index be defragmented.

Another type of recommendation that the community analysis system 140 may make to tenants is based on past observations or experience. Such experience can be encoded in the form of rules or policies that the community analysis system 140 uses to evaluate data collected from the tenant systems 110. The community analysis system 140 can make recommendations based on these experiential rules or policies regardless of the performance of the community or accepted/best practices. One example of such a policy is that in VMWare™ virtual computing environments, if different virtual machines on the same physical server are assigned different numbers of virtual CPUs, such a configuration tends to degrade the performance of the virtual machines with the larger number of virtual CPUs assigned. Based on this experiential knowledge stored in the form of a rule or policy, the community analysis system 140 can detect such a condition in a tenant system 110 and recommend that the tenant system 110 configure each virtual machine to have the same number of virtual CPUs.

These examples of best practices and experiential rules or policies are merely examples of many types of best practices and rules/policies that the community analysis system 140 can use to make recommendations to tenants. In one embodiment, the community analysis system 140 recommends configuration changes to tenants based on best practices or experiential rules/policies as default recommendations should no community-based recommendations be available. In another embodiment, the community analysis system 140 recommends configuration changes to tenants based on best practices or experiential rules/policies together with community-based recommendations.

Moreover, in some embodiments, the community analysis system 140 uses feedback information obtained from the tenant systems 110 to improve recommendations. The community analysis system 140 can collect feedback information from tenant systems 110 to which configuration changes have been recommended. In general, if the performance of the tenant systems 110 improved based on a recommended characteristic, the community analysis system 140 can continue to recommend the characteristic. The community analysis system 140 can also strengthen the recommendation of the characteristic in view of the positive feedback, for example, by increasing the ranking of this recommendation for subsequent target tenant systems 110. When recommending this characteristic to subsequent target tenant systems 110, the community analysis system 140 can also provide an explanation for the recommendation that informs a user of the target tenant 110 that other systems' performance has improved (and optionally by how much) since implementing the recommended change.

Conversely, the community analysis system 140 can also discontinue recommending characteristic changes if the feedback information indicates that performance has not improved, has not improved in a statistically significant amount (e.g., one or more standard deviations from the mean improvement), or has worsened. In determining whether the recommended characteristic change has improved or worsened performance, the community analysis system 140 can obtain the feedback information from multiple tenant systems to which the change has been recommended. The community analysis system 140 can then determine whether the performance change has been consistent or statistically significant across the multiple tenant systems. For example, the community analysis system 140 may compute the average performance increase that occurred after the change was made (and optionally before other changes were made). If multiple changes are recommended and multiple changes are made, the community analysis system 140 can impute the performance increase or decrease to each of the changes made. Alternatively, the community analysis system 140 can weight the contribution of each configuration change to determine the degree to which each configuration change likely affected the performance change.

Figure 4:
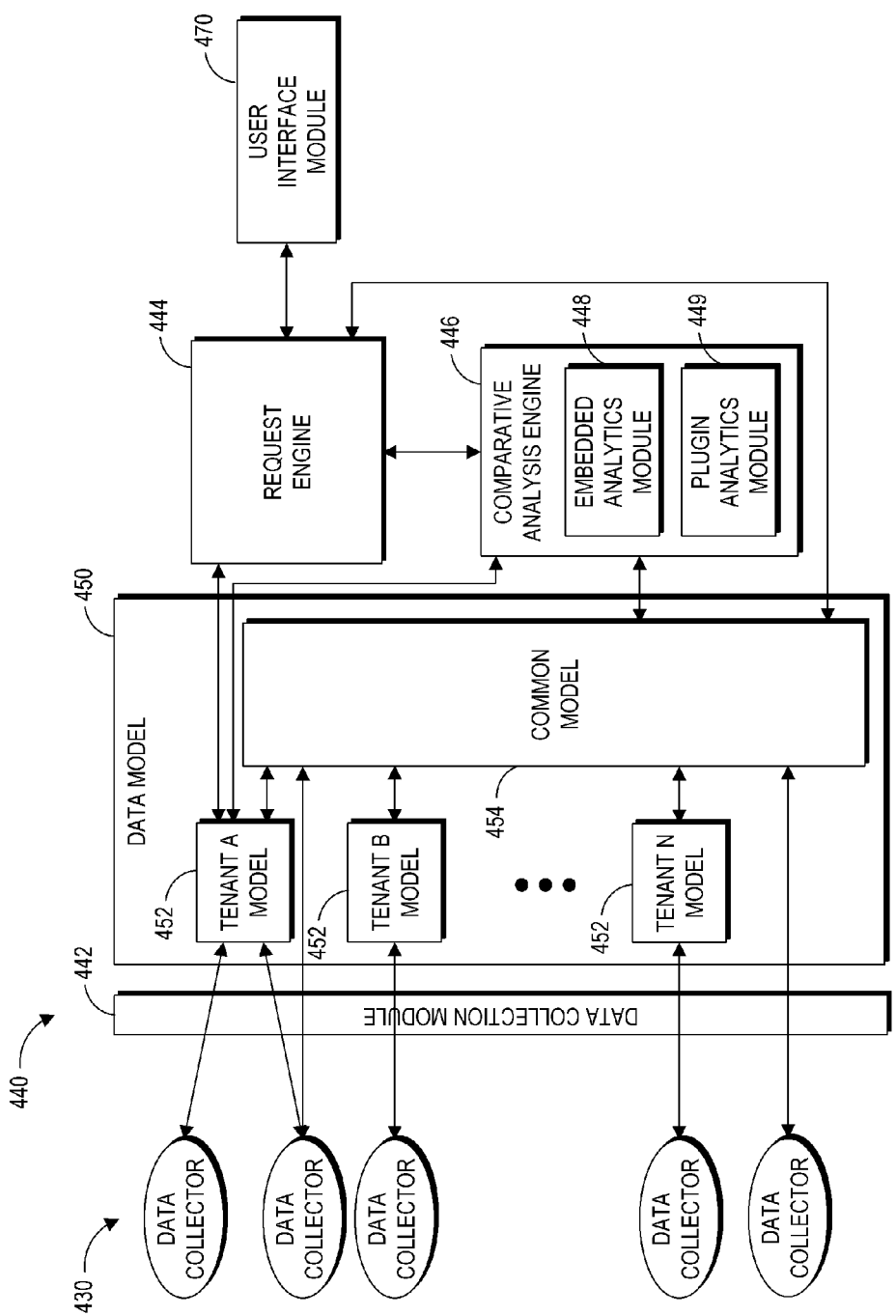
FIG. 4 illustrates another embodiment of the community analysis system of FIG. 1.

FIG. 4 illustrates another embodiment of a community analysis system 440 that can implement features of the community analysis system 140 of FIG. 1. Data collectors 430, which may be local to the tenant systems 110 or to the community analysis system 440, feed collected monitoring data to a data collection module 442. The data collection module 442, like the data collection module 142, can supply the collected data to a data repository. In the depicted embodiment, the data collection module 442 stores the collected data in a data model 450.

The data model 450 can have any of a variety of structures and can be implemented using any of a variety of data types. In one embodiment, the data model 450 is a topology model, like the topology models described in the '245 patent and the '399 application. Accordingly, the data model 450 can have a hierarchical data structure that relates different monitored systems together. The data collection module 442 can be responsible for creating and maintaining the data model 450 using techniques such as those described in the '245 patent and the '399 application or variations thereof.

The data model 450 includes monitoring data for each tenant. This data can be stored in separate models 452, in a community model 454 for all (or a subset of) tenants, or a combination of both, as shown. Even if the data is stored together in a single community model 454, the data for multiple tenants can be kept separate from a user access perspective.

The model 452 for a given tenant may reside on across one or more management servers but may be seen by the tenant as one complete logical model. Similarly, the common model 454 may reside on a single management server co-located with the tenant models 452 or on a separate management server or across multiple management servers. The specific placement of models 452, 454 can be determined at the point of deployment so as to scale for anticipated load and may change over time.

At configurable frequencies, in response to events, or the receipt of specific monitoring data, the comparative analysis engine 446 can be activated. The comparative analysis engine 446 can operate in response to events which may be internally or externally generated with respect to the comparative analysis engine 446. Events may include, but are not limited to, scheduled times for computing analysis, data values received (e.g., from particular components that update and therefore cause the analysis to be outdated, thus triggering recomputing the analysis), based on performance monitoring alarms, and via specific request via a user interface module 470 (see below). The comparative analysis engine 446, in response to the event occurring, can determines which analyses it should run. For example, for a data received event, the comparative analysis engine 446 can update any applicable form(s) of analysis for that data item. For an on-demand event, the comparative analysis engine 446 can run just those analyses which relate to the demand being made. Instead of being event-driven, in one embodiment the comparative analysis engine 446 runs constantly or substantially constantly.

The comparative analysis engine 446 in the depicted embodiment includes the functionality of the comparative analysis engine 446 as well as the community analytics module 144, implemented as an embedded analytics module 448 and optional plugin analytics module 449. The analytics modules 448, 449 can compare monitoring data in the data model 450 to determine statistical data using the techniques described above. The comparative analysis engine 446 can cause this statistical data to be saved in the tenant models 452 and/or common model 454 for later use. Alternatively, the engine 446 generates some or all of this data transiently and does not persist the data to physical computer storage. In certain embodiments, the plugin analytics module 449 can allow for extensibility of analytics modules, which can simply be plugged into the comparative analysis engine 446 (e.g., using programming constructs such as are available with the Groovy programming language or other languages).

A user can access the community analysis system 440 through a user interface module 470. For example, once a user has logged into the system 440 through the user interface module 470 in one embodiment, the user's tenant identity can be established and used to display just the data belonging to the tenant and community data. The user interface module 470 interfaces with a request engine 444 that can obtain data directly from the tenant models 452, community model 454, and/or from the comparative analysis engine 446. Community data can be presented without identifying the tenants associated with the community data (other than the tenant associated with the user himself). In this manner, privacy can be preserved even while sharing community data.

The user interface module 470 can present statistics for the user (obtained from the tenant model) versus the community of tenants as a whole or a subset thereof (which may be obtained from the common model). If the user requests through the user interface module 470 further information to understand the reasons behind the statistical differences, the request engine 444 can make a request for recommendations. This request can retrieve the recommendations from the model(s) 452, 454 if available or can trigger the comparative analysis engine 446 to generate and provide the recommendations on demand.

In response to receiving a request for further information to understand the reasons behind the statistical differences, the comparative analysis engine 446 can implement the process 300 of FIG. 3 to provide comparative analysis information in the form of recommendations or suggestions to the user. In performing this process 300 or a variation thereof, the comparative analysis engine 446 can use statistical significance to identify configuration differences between top performers (or others) that may reflect the likelihood of these differences being responsible for differences in performance between the user (tenant) and the community. Statistical significance can be measured using any currently-available technique. When comparing a tenant's characteristics with the characteristics of the community, for instance, the comparative analysis engine 446 can flag statistically significant items based on variation from the norm.

The user may elect to ask for a further analyses to determine if there are differences in the configuration and use of the user's infrastructure (e.g., settings, sizes, load, etc.) that differ from the community norms which might account for the statistical variations seen. This analysis of the comparative analysis engine 446 can use statistical techniques, rules, learned values either individually or collectively to make a determination and provide the user not just with an answer but also the degree of confidence in that answer.

III. Example User Interfaces

FIG. 5 through 10 illustrate example community analytics user interfaces. Each of these user interface are shown as web pages for example purposes. However, as described above, these user interfaces can be implemented in client applications other than browsers. The user interfaces described herein include user interface controls such as buttons, menus, and so forth. It should be understood, however, that these user interface controls can be modified or replaced with equivalent or similar controls in other embodiments. Each of the user interfaces shown can be output by the community analysis system 140 of FIG. 1 or the user interface module 470 of FIG. 4.

Figure 5:
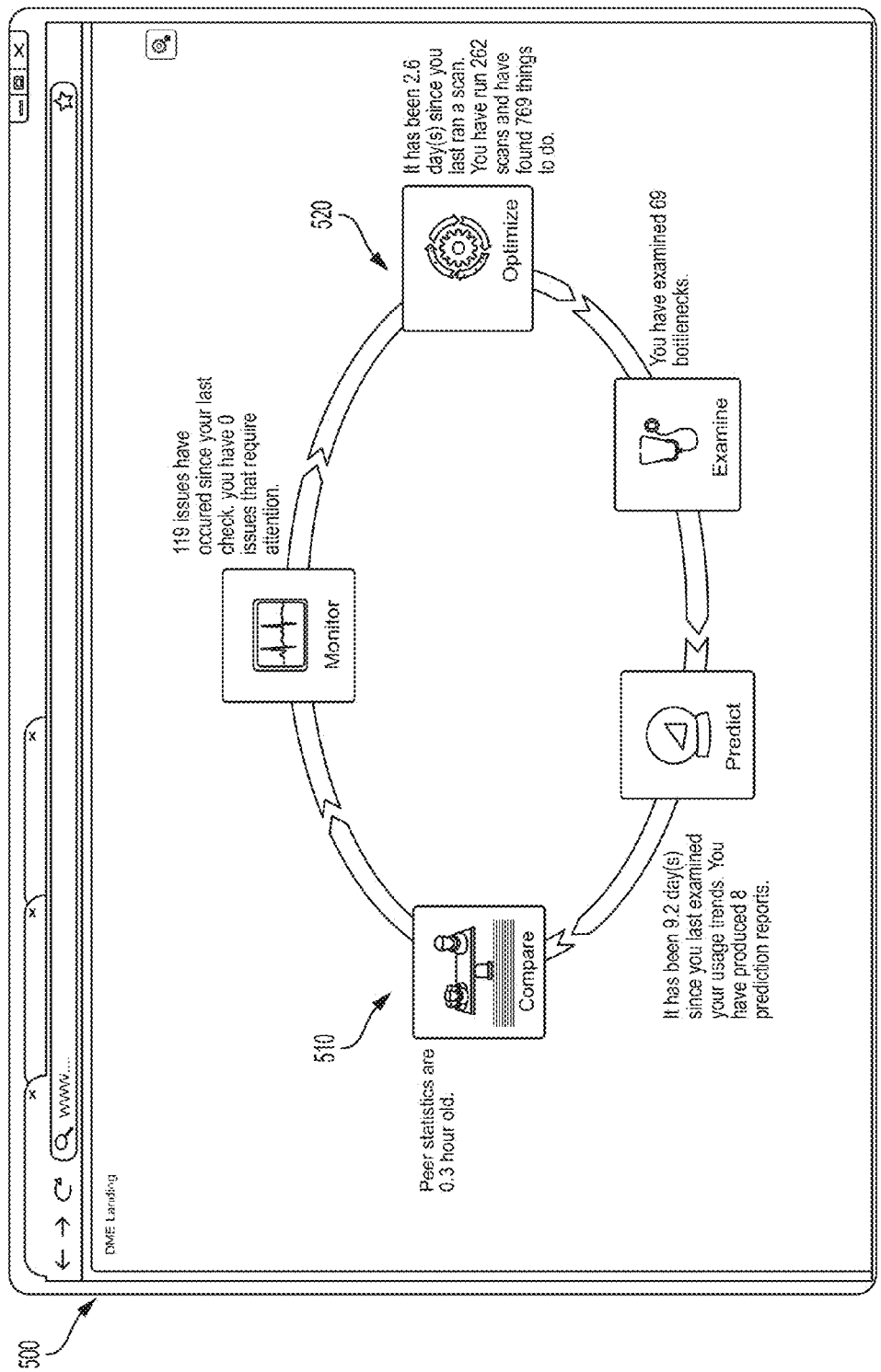

Referring to FIG. 5, a user interface 500 is shown that represents an initial landing page for conducting performance monitoring of monitored systems 110, optimization of system characteristics, comparison of system characteristics to community norms, and so forth. A comparison button 510 can be selected by a user to obtain community analytics generated by the community analytics module 144 or the comparative analytics engine 446. Selection of this button 510 can cause the user interface module 470 to output any of the user interfaces shown in FIGS. 6 through 10.

User selection of an optimization button 520 can cause the user interface module 470 to present a user interface with recommendations or suggestions for changing monitored system characteristics to improve performance. Selection of this button 520 can cause the user interface 470 to present to the user the user interface shown in FIG. 11. As will be described in greater detail below, the user interface shown in FIG. 11 can also be reached from some or all of the user interfaces shown in FIGS. 6 through 10.

Figure 6:
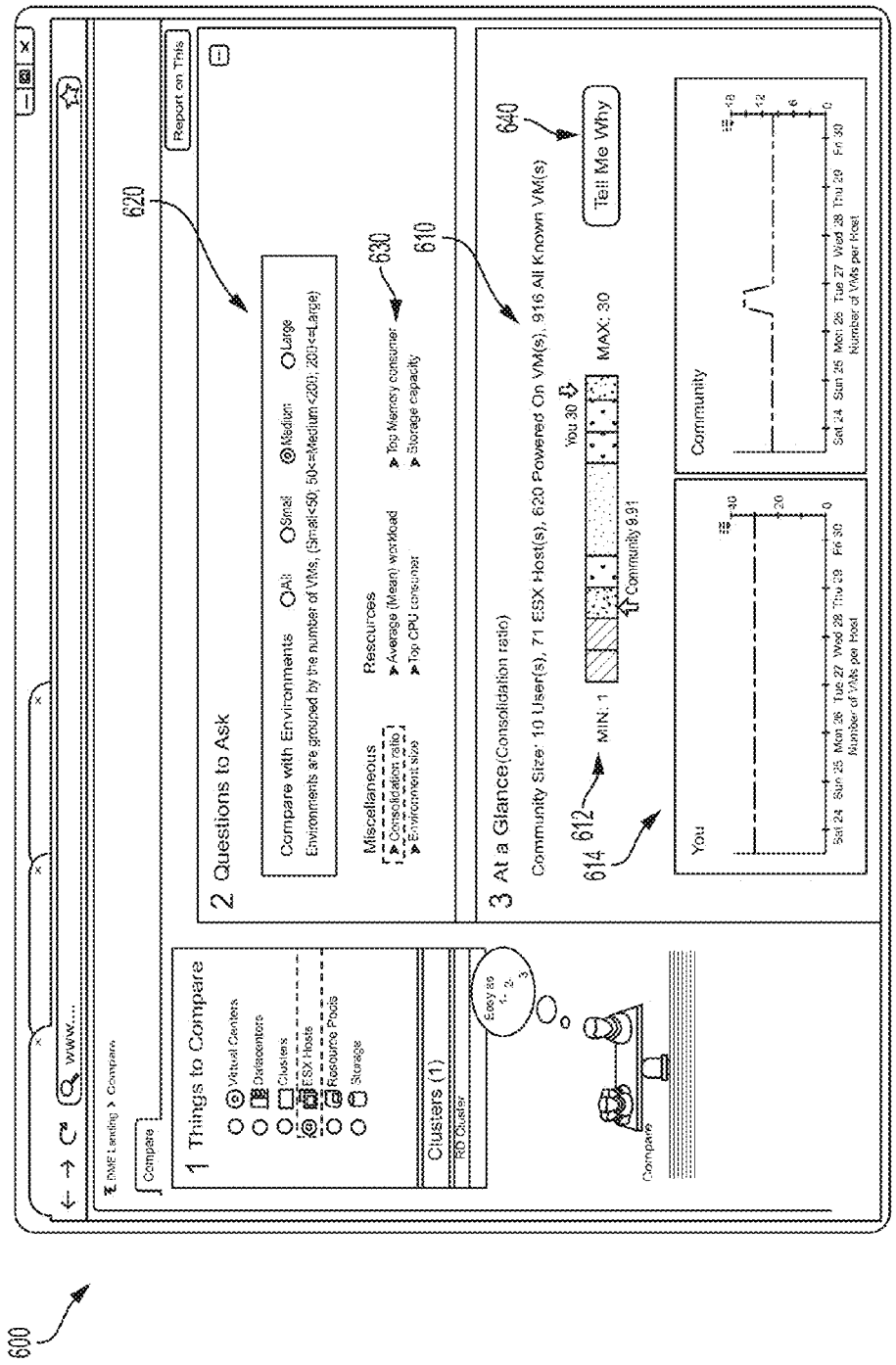

Referring to FIG. 6, a user interface 600 that presents comparative analytics 610 to a user is shown. The comparative analytics 610 in this particular user interface 600 include information regarding a consolidation ratio, representing a number of VMs running per host computing device. In the graphic shown, the comparative analytics include graphs 612, 614 that depict the number of VMs per host of an example tenant (30) versus the average for the community (9.91). Menu buttons 630 allow a user to navigate to additional analytics regarding information on environment size, mean workload, CPU consumption, memory consumption, and storage capacity, some of which are shown in FIGS. 7 through 10.

Computing environment comparison buttons 620 allow different subsets of the community to be compared with the example tenant. These environments include small, medium, large, and all tenants. The community analysis system 140 or 440 can classify tenants by model tiers in some embodiments by deriving metrics about the size and shape of tenant topology models (see FIG. 4) and by creating a set of model tiers that can be used to classify tenants accordingly. In the depicted embodiment, tenant systems or environments are tiered or otherwise grouped according to their size in total virtual machines (VMs), although other classification schemes can be employed in other embodiments. Tiering of tenants can advantageously allow similar comparisons to be made amongst tenants. Tiering can be omitted, however, in some embodiments.

An explanation request button 640 is also shown on the user interface 600. User selection of the explanation request button 640 can trigger the comparative analysis engine 146 or 446 to access recommendations or generate recommendations on demand for presentation to the user (see, e.g., FIG. 11). The example button 640 shown includes the text "Tell Me Why," indicating that an explanation for the tenant's performance difference from the community can be obtained by selecting this button 640.

Figure 7:
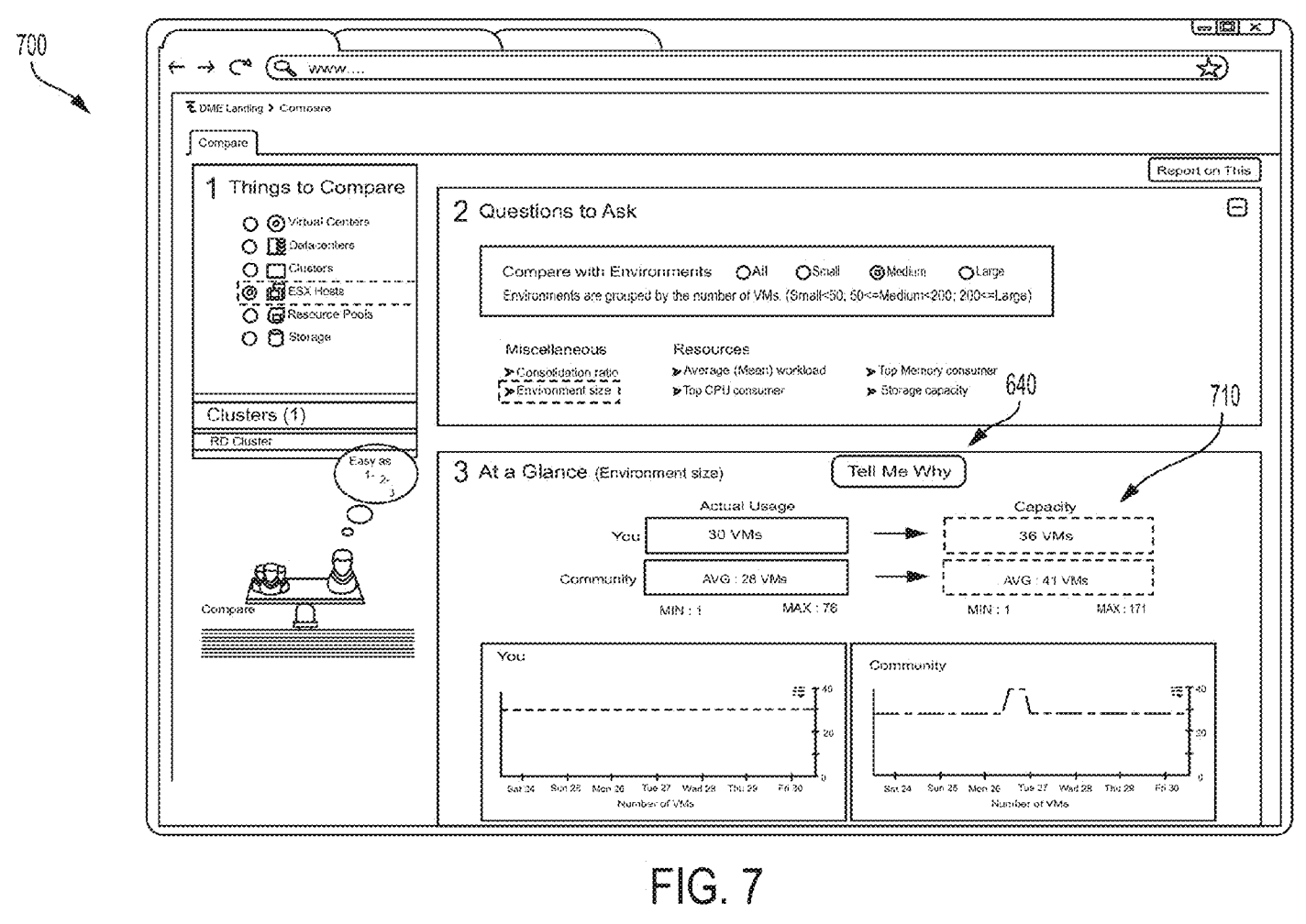
Figure 8:
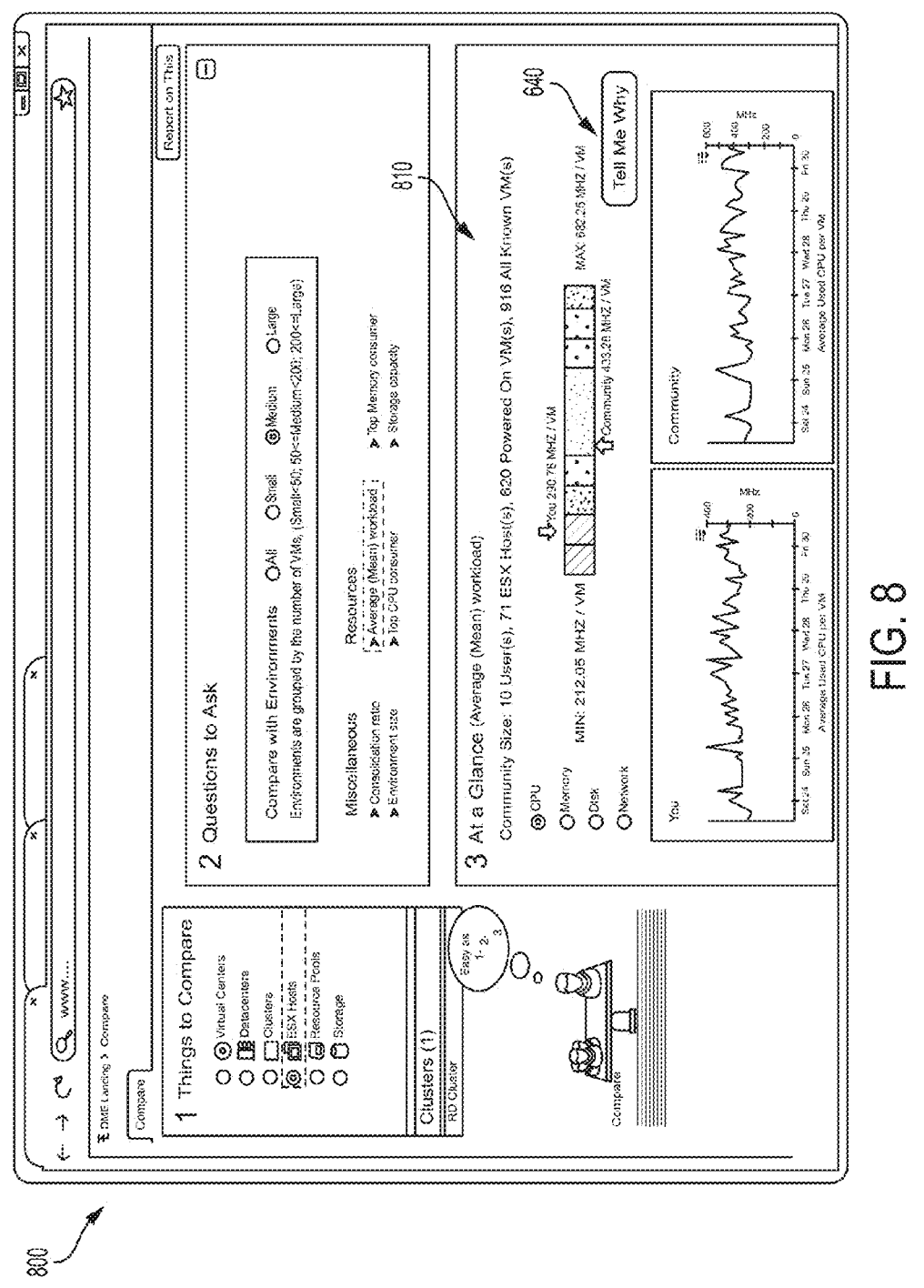
Figure 9:
Figure 10:
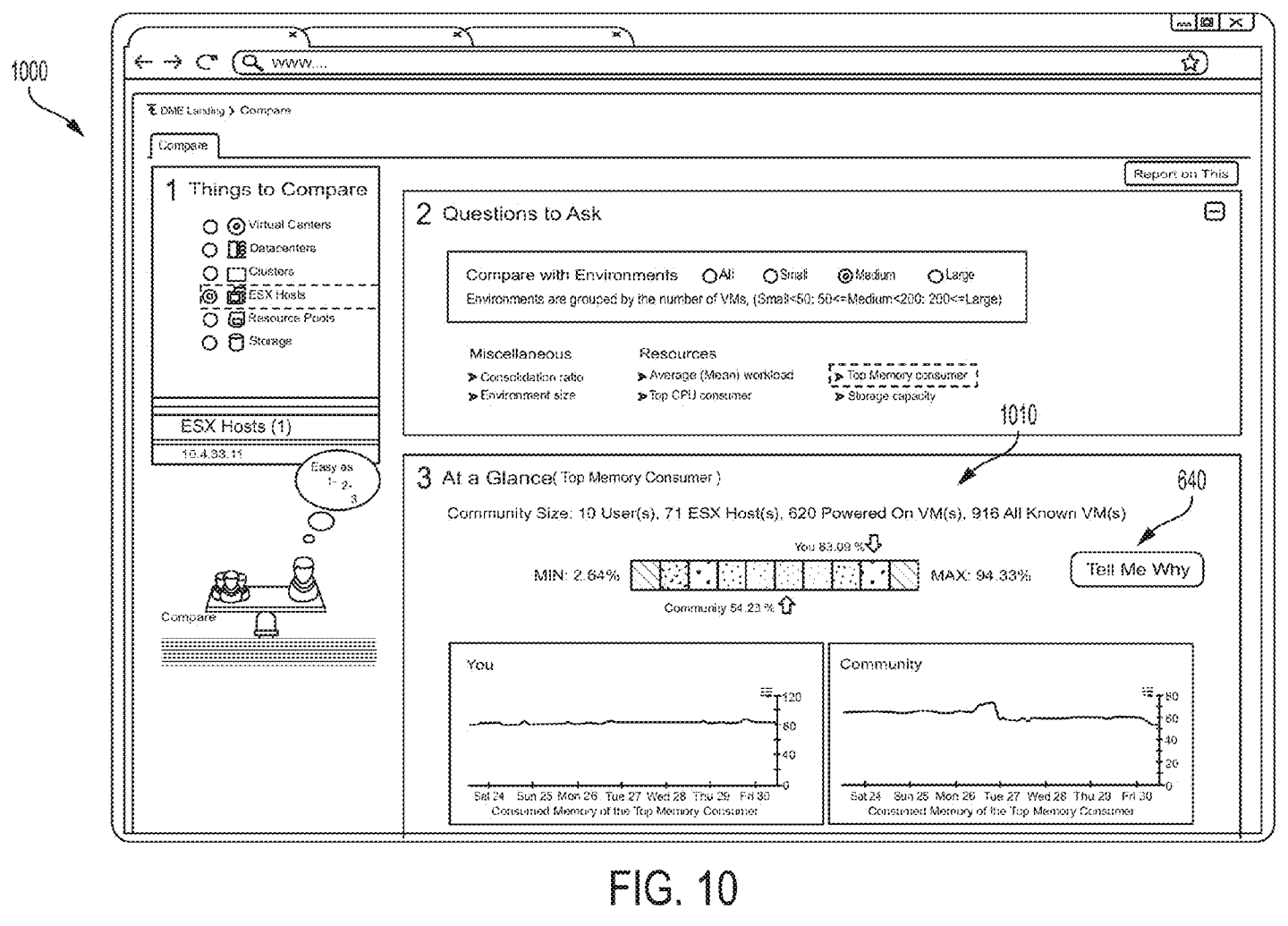

FIG. 7 illustrates another user interface 700 similar to the user interface 600 of FIG. 6, except that analytics 710 are shown for environment size instead of consolidation ratio. Similarly, FIG. 8 depicts a user interface 800 with workload analytics 810, FIG. 9 depicts a user interface 900 with CPU usage analytics 910, and FIG. 10 depicts a user interface 1000 having memory analytics 1010. In each of these user interfaces 700-1000, the explanation request button 640 is also provided.

Figure 11:
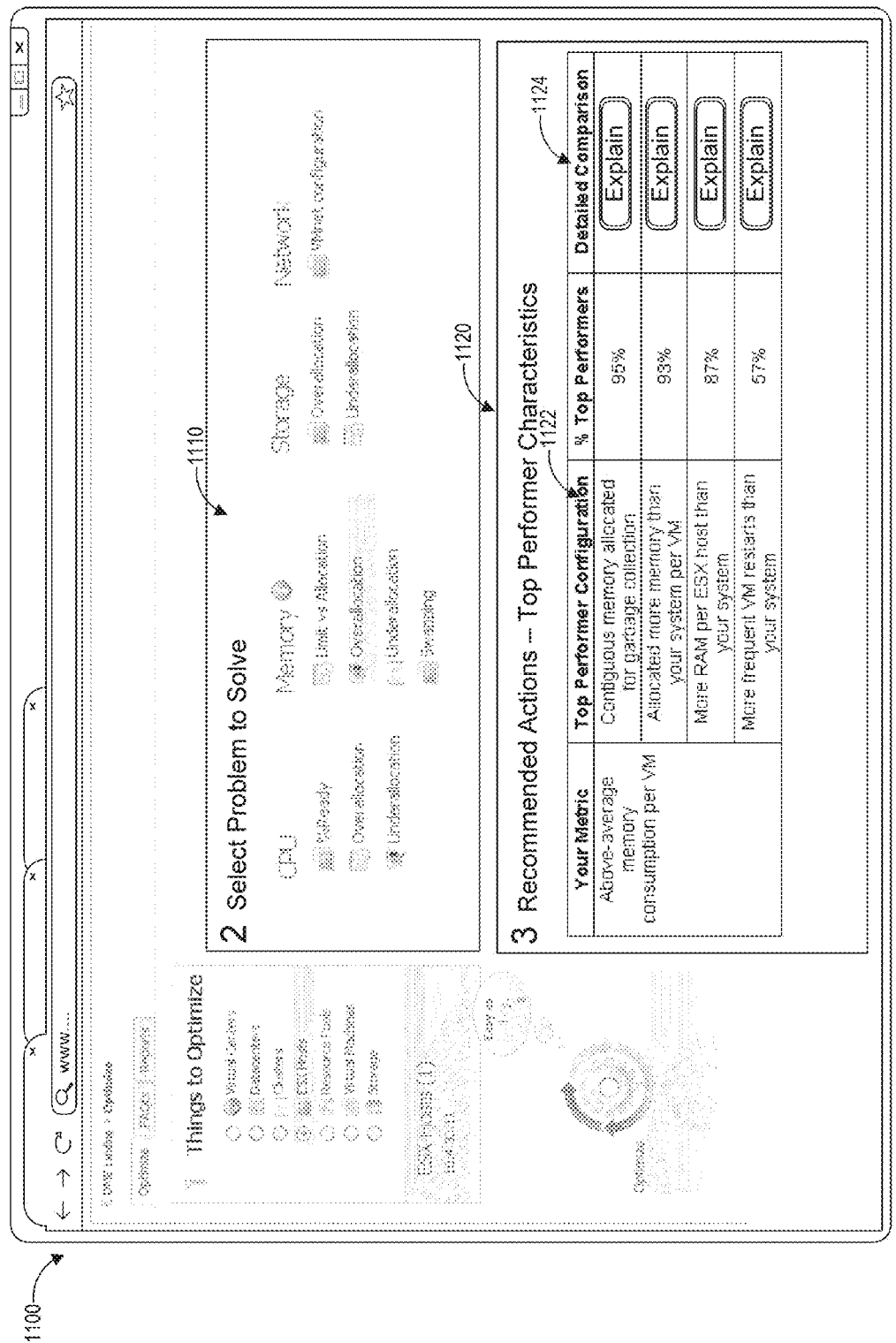
FIG. 11 illustrates an example performance recommendations user interface that can be output by the community analysis system.

Turning to FIG. 11, an example performance recommendations user interface 1100 is shown. As described above, the user interface 1100 can be reached from the user interface 500 (via the button 520) or from any of user interfaces 600 through 1000 (via the button 640). The user interface 1100 includes a menu 1110 that provides options for a user to select a problem to solve, such as problems related to CPU usage, memory usage, storage usage, and network usage. User selection of any of these menu options 1110 can cause the comparative analysis engine 146, 446 to obtain or generate comparative analytics or recommendations for a user.

Recommendations or explanations of differences in tenant and community performance are shown in box 1120. This box 1120 lists a metric of the user, such as an above-average memory consumption per virtual machine. The box 1120 also lists recommended configuration changes 1122, described as "top performer configurations" in the FIGURE. The box 1120 further lists the percentage of top performers who share these features and provides "explain" buttons 1124 that enable a user to obtain more information about each recommended configuration change 1122. Upon selection of one of the explain buttons 1124, the community analysis system 140 or user interface module 470 can output another user interface (e.g., as a popover on the user interface 1110 or on a separate page) that offers a textual and/or graphical explanation for the recommended configuration change 1122. This explanation may provide a number, percentage, or other statistic regarding other tenant systems that use the recommended configuration. One example of such an explanation can be as follows: "Recommended because 92% of systems performing better than you in this metric have implemented this configuration and less than 5% of systems performing worse than you have implemented this configuration." If the recommendation is a best practice or experiential recommendation (see description above with respect to FIG. 3), the explanation can explain this source of the recommendation. Explaining the source of the recommendation, whether it be a best practice, experience, or from community analysis, can increase a user's trust that the recommendation is useful. Explanations can therefore give users confidence that the recommended changes may provide a performance increase. Without the explanations, users may be less apt to trust the output of a machine. However, explanations are optional in some embodiments.

Thus, a user presented with the recommended configuration changes 1122 based on the community analysis performed can attempt to improve a monitored systems' performance by implementing some or all of the changes 1122. Furthermore, in some embodiments, the community analysis system 140 can directly implement the changes on the tenant/monitored systems. The community analysis system 140 can, for instance, make a web service call or a remote procedure call or the like to the monitored system in question with an instruction to change a certain configuration. In one embodiment, the recommended configuration changes 1122 in the user interface 1100 are selectable by a user (e.g., via hyperlink) to cause the community analysis system 140 to send a web service call or other call to the monitored system in question. In response to receiving the web service call or other call, the monitored system can implement the change automatically.

A software layer can be provided on the monitored system to receive the web service calls or other calls and translate the received calls into configuration change instructions that are understandable by the monitored system. For example, the community analysis system 140 can send an instruction such as "increase average memory allocation per virtual machine" as a web service call. The monitored system can receive this call and issue an appropriate call to a VMware vCenter™ Server (or the like, in other non-VMware™ environments) to cause the Server to adjust the memory allocation. The community analysis system 140 can also send VMware™ or other commands that the monitored system can execute directly, packaged in a web service or other call, thus obviating the need for a translation component on the monitored system. If VMware vCenter™ Server (or similar system) were to provide remote web service communication functionality, for instance, the community analysis system 140 can directly communicate configuration changes to the VMware vCenter™ Server (or similar system).

In some embodiments, the user interface 1100 can provide options for users to select whether to automatically perform configuration changes. Such options can allow users to cause the community analysis system 140 to automatically implement the top configuration change, or a top percentage of configuration changes, for example. In another embodiment, the user interface 1100 can provide options for users to ignore recommendations and optionally to cause certain recommendations not to be displayed again. For instance, a "do not make this recommendation again" button or the like could be provided on the user interface 1100.

While the user interface 1100 shows one example configuration of performance recommendations, many other configurations of performance recommendations could be provided. In one embodiment, for example, the performance recommendations can be output together with categories associated with those recommendations. These categories can include the categories to which each recommendation corresponds, and an associated confidence score may be assigned to each recommendation. In the example shown where the metric selected by the user for comparison with the community is above-average memory consumption, the recommended changes 1122 can be further grouped into categories such as memory configuration changes, network CPU configuration changes, storage configuration changes, network configuration changes, and so on. The recommendations can be output in a tree or hierarchical format in one embodiment, arranged according to category, for example. In some embodiments, the category that a recommended change falls in can be taken into account when scoring and/or ranking the recommended changes for output to a user. For instance, in one embodiment, only recommended changes 1122 that have a certain confidence score or ranking are shown, as described above.

IV. Additional Embodiments

The features described herein can be implemented outside of the computing performance monitoring contexts described above. These features can be used, for example, to recommend better routes in logistics or networking problems, better configurations in VoIP telephony, better vehicle computer configurations to improve gas mileage or fuel consumption, better electric power meter configurations, and so forth. More generally, community data can be collected for any electronic or computing system and analyzed to recommend changes to configurations in those systems to obtain improved performance.

V. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of providing community analytics related to a plurality of tenant systems, the method comprising:
    collecting data from a plurality of tenant systems, at least some of the tenant systems being operated by different entities, the plurality of tenant systems constituting a community of tenant systems associated for the purpose of sharing comparative analytics about the tenant systems;
    computing analytics from the data collected from the tenant systems, the analytics comprising statistics that reflect shared aspects of the tenant systems;
    receiving a request for analytics from a user of a first one of the tenant systems;
    in response to receiving the request, outputting for presentation to the user both a portion of the collected data regarding the first tenant system together with at least a portion of the computed analytics for comparison, thereby enabling the user to compare aspects of the first tenant system with the analytics associated with the community;
    wherein at least said computing the analytics is implemented by a computer system comprising computer hardware;
    identifying top performers of the tenant systems, other than the first tenant system, on one of the computed analytics;
    comparing differences between characteristics of the top performers and the first tenant system;
    identifying one or more characteristics for which a statistically-significant number of the top performers have a similar configuration; and
    outputting, to the user of the first tenant system, a representation of the one or more characteristics as recommendations for potential configuration change to the first tenant system.

2. The method of claim 1, wherein the shared aspects of the tenant systems comprise one or more of the following: virtual machine information, host information, workload, central processing unit (CPU) usage, and memory usage.

3. The method of claim 2, wherein the analytics comprise one or more of the following: an average number of virtual machines in at least some of the tenant systems, an average number of virtual machines per host, average CPU usage per virtual machine, average memory usage per virtual machine, used CPU amount for a top CPU consumer, consumed memory of a top memory consumer, and storage capacity.

4. The method of claim 1, wherein said collecting, said receiving, and said outputting are implemented by the computer system.

5. The method of claim 1, wherein the computer system comprises a plurality of physical computing devices.

6. A system for providing community analytics related to a plurality of tenant systems, the system comprising:
    a data collection module configured to collect data from a plurality of tenant systems;
    a community analytics module implemented by one or more processors, the community analytics module configured to compute analytics from the data collected from the tenant systems with one or more processors, the analytics comprising statistics that reflect shared aspects of the tenant systems; and
    a user interface module configured to output for presentation to the user both a portion of the collected data regarding the first tenant system together with at least a portion of the computed analytics for comparison, thereby enabling the user to compare aspects of the first tenant system with the analytics associated with the community;
    a comparative analysis engine configured to generate performance recommendations that recommend configuration changes to the tenant system related to the computed analytics; and
    wherein the comparative analysis engine is further configured to generate the performance recommendations by comparing differences between configurations of second ones of the tenant systems that perform better than the first tenant system on a first of the computed analytics.

7. The system of claim 6, wherein the comparative analysis engine is further configured to generate the performance recommendations by ranking the configurations of the second tenant systems based at least in part on a degree of confidence that the configurations cause better performance on the first computed analytic.

8. The system of claim 6, wherein the comparative analysis engine is further configured to generate the performance recommendations by ranking the configurations of the second tenant systems based at least in part on categories of the configurations and a category of the first computed analytic.

9. Non-transitory physical computer storage comprising instructions stored thereon that, when executed in one or more processors, implement operations for providing community analytics related to a plurality of tenant systems, the operations comprising:
- collecting data from a plurality of tenant systems, the tenant systems being operated by different entities, the plurality of tenant systems constituting a community of tenant systems associated for the purpose of sharing comparative analytics about the tenant systems;
- computing analytics from the data collected from the tenant systems with one or more processors, the analytics comprising metrics that reflect shared aspects of the tenant systems; and
- outputting for presentation to a user of a first one of the tenant systems both a portion of the collected data regarding the first tenant system together with at least a portion of the computed analytics for comparison, thereby enabling the user to compare aspects of the first tenant system with the analytics associated with the community; and
- generating the performance recommendations that recommend configuration changes to the tenant system related to the computed analytics;
- wherein the performance recommendations are generated by comparing differences between configurations of second ones of the tenant systems, other than the first tenant system, that perform better than the first tenant system on a first of the computed analytics.

* * * * *